(12) United States Patent
Chakra et al.

(10) Patent No.: US 8,122,368 B2
(45) Date of Patent: Feb. 21, 2012

(54) SYSTEM AND METHOD TO FACILITATE PROGRESS FORKING

(75) Inventors: Al Chakra, Apex, NC (US); Lama Chakra, Apex, NC (US)

(73) Assignee: Internaitonal Business Machines Corporation, Armonk, NY (US)

( * ) Notice: Subject to any disclaimer, the term of this patent is extended or adjusted under 35 U.S.C. 154(b) by 925 days.

(21) Appl. No.: 11/931,215

(22) Filed: Oct. 31, 2007

(65) Prior Publication Data
US 2009/0113334 A1 Apr. 30, 2009

(51) Int. Cl.
*G06F 3/048* (2006.01)
(52) U.S. Cl. .......................... 715/772; 715/779
(58) Field of Classification Search .................. 715/772, 715/779, 764
See application file for complete search history.

(56) References Cited

U.S. PATENT DOCUMENTS

| | | | | |
|---|---|---|---|---|
| 6,788,315 | B1 * | 9/2004 | Kekic et al. | 715/733 |
| 6,941,522 | B2 * | 9/2005 | Brown | 715/772 |
| 2005/0102631 | A1 * | 5/2005 | Andreas et al. | 715/772 |
| 2006/0212329 | A1 * | 9/2006 | Lucas et al. | 705/8 |
| 2007/0168861 | A1 * | 7/2007 | Bell et al. | 715/701 |
| 2007/0255977 | A1 * | 11/2007 | Liccione et al. | 714/4 |
| 2009/0106685 | A1 * | 4/2009 | Care | 715/772 |

* cited by examiner

*Primary Examiner* — Ba Huynh
(74) *Attorney, Agent, or Firm* — Hamilton & Terrile, LLP; Stephen A. Terrile

(57) ABSTRACT

A method, system and computer-usable medium are disclosed for providing graphical completion status information for the management of serial computer operations that are forked into parallel operations. A first interactive progress bar, comprising a plurality of progress indicator segments, is implemented to show the completion status of a composite application. A second progress bar is implemented for each element of the composite application as it is executed. Elements that are serially executed may require prerequisite or dependent operations. Forking operations are performed to execute elements in parallel. One or more progress indicator segments are selected to display information about their related computer operations. The user interacts with the information to pause, modify, reorder, reverse, retarget, or reverse the selected computer operations.

14 Claims, 14 Drawing Sheets

| Operation 'A' Install Database 402 | Operation 'B' Install Database Service Pack 404 | Operation 'C' Install LDAP Server 406 | Operation 'D' Install HTTP Server 408 | Operation 'E' Configure Heap 410 | Operation 'F' Close Applications 412 | Operation 'G' Delete Installation Files And Clean Up 414 |

Figure 4a

| Operation 'A' Install Database 402 | Operation 'B' Install Database Service Pack 404 | Operation 'C' Install LDAP Server 406 | Operation 'D' Install HTTP Server 408 | Operation 'E' Configure Heap 410 | Operation 'F' Close Applications 412 | Operation 'G' Delete Installation Files And Clean-up 414 |

Figure 4b

| Operation 'A' Install Database 402 | Operation 'B' Install Database Service Pack 404 | Operation 'C' Install LDAP Server 406 | Operation 'D' Install HTTP Server 408 | Operation 'E' Configure Heap 410 | Operation 'F' Close Applications 412 | Operation 'G' Delete Installation Files And Clean-up 414 |

Figure 4c

SYSTEM AND METHOD TO FACILITATE PROGRESS FORKING

BACKGROUND OF THE INVENTION

1. Field of the Invention

Embodiments of the disclosure relate in general to the field of computers and similar technologies, and in particular to software utilized in this field. Still more particularly, it relates to providing graphical completion status information for the management of serial computer operations that are forked into parallel operations.

2. Description of the Related Art

Conventional computer applications often use a graphical progress indicator to provide users feedback about the completion status of computer operations as they are being performed. Progress indicators are often used during software installations, lengthy calculations, and automated test executions while back-end logs and trace files of the procedures are being written. The typical progress bar provides the user with an estimate of how much time it will take to complete the entire operation and an indication of how much progress has been made thus far.

Prior art approaches have included progress bars, which include a completion progress indicator that comprises a plurality of progress indicator segments. Completed progress indicator segments are generally depicted in a graphical user interface (GUI) as one color and uncompleted progress indicator segments in another. As increments of progress are achieved, the number of completed progress indicator segments increase and the number of uncompleted progress segments decrease. While completion progress indicators may provide some indication of how complete a series of computer operations may be, or an estimate of the time remaining until completion, they typically do not provide completion detail about individual operations. Another approach is to combine a checklist of computer operations with a time remaining progress indicator. The computer operation checklist generally comprises a list of computer operations, each of which has a corresponding graphical icon to symbolize operations that were completed successfully, with errors, or with failures. While the progress indicator with checklist provides a summary of computer operations and their corresponding status through graphical icons, it does not provide meaningful detail about failed operations.

Today's large enterprise applications are often comprised of multiple software components and sub-applications. In recent years it has become common to implement these large applications in complex computing environments that include multi-processor machines, clusters of servers, and distributed computers connected by a network. Despite their size and complexity, the installation process of these applications is often performed serially. However, the installation of individual components can often be performed in parallel, especially when multiple target machines are involved. When this is the case, it is challenging to discern the individual progress of these parallel processes with a single progress bar. As a result, it would be advantageous to present multiple progress bars to the user as a serial process forks into multiple, parallel processes. Furthermore, there are times when a series of computer operations are begun, only to later determine that it may be desirable to retarget one, or all, of the application components to a different machine. It would be similarly advantageous to be able to re-target the operation of an application or process by selecting their respective progress indicator segments and graphically retargeting them without interrupting the overall process. However, current progress indicator approaches are serially oriented for the overall process and require the user to wait until all parallel operations have been completed, or ended prematurely, to change the targeting of individual application components.

BRIEF SUMMARY OF THE INVENTION

The present invention includes, but is not limited to, a method, system and computer-usable medium for providing graphical completion status information for the management of serial computer operations that are forked into parallel operations. In various embodiments, a first interactive progress indicator bar is implemented in a graphical user interface (GUI) to show the completion progress of a composite application comprising other applications, sub-applications, modules, and other components. The first interactive progress indicator bar comprises a plurality of progress indicator segments, each of which corresponds to an element of the composite application. As each element is executed, a second interactive progress indicator bar is implemented within the GUI. In some embodiments, the elements are executed serially and may require that prerequisite or dependent operations are performed for their completion. In other embodiments, predetermined elements may be executed in parallel. In these embodiments, forking operations are performed and a second interactive progress indicator bar is implemented for each element in parallel. Each of the second interactive progress indicator bars further comprises progress indicator segments. As computer operations are completed, the details of their completion status are entered into a computer operation log and indexed to their corresponding progress indicator segments. As increments of progress are achieved, a completion progress indicator is updated to graphically and textually reflect the percentage of completed computer operations.

In different embodiments, information relating to the computer operations of the composite application is viewed by selecting one or more progress indicator segments through a GUI user gesture. The level of information detail for the selected segments is determined and then displayed. The user then interacts with the information to pause, modify, reorder, reverse, retarget, or reverse the selected computer operations. In one embodiment, the machine originally targeted for a computer operation may have insufficient resources, such as processors, memory, or storage to meet the requirements of the selected computer operation. As a result, the computer operation is retargeted to another machine for execution.

In one embodiment, the retargeting is performed manually. First, a GUI user gesture is used to select the secondary interactive progress indicator bar representing the computer operation to be retargeted. Another user gesture opens an options menu and the user selects "retarget operation". A dialog window is opened, showing other target machines and related information, such as their available capacity or resources. The user selects a target machine and the computer operation is restarted on the selected machine. In another embodiment, the secondary interactive progress indicator bar is selected through a user gesture, and then dragged and dropped on an icon representing the target machine. The operation then restarts on the target machine. In other embodiments, the retargeting is performed automatically, such as with a load balancer for retargeting the computer operation to different physical machines. In another embodiment, a virtual machine manager (VMM) for retargets the computer operation to different virtual machines. In yet another embodiment, the computer operation is replicated by retargeting it to additional machines. In these and other embodiments, prerequisite and dependent operations may also need to be performed, modified, or reordered as a result of retargeting the computer operation. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which:

FIGS. 4a-c show a simplified block diagram of computer operations to be reordered prior to their completion;

DETAILED DESCRIPTION

Figure 1:
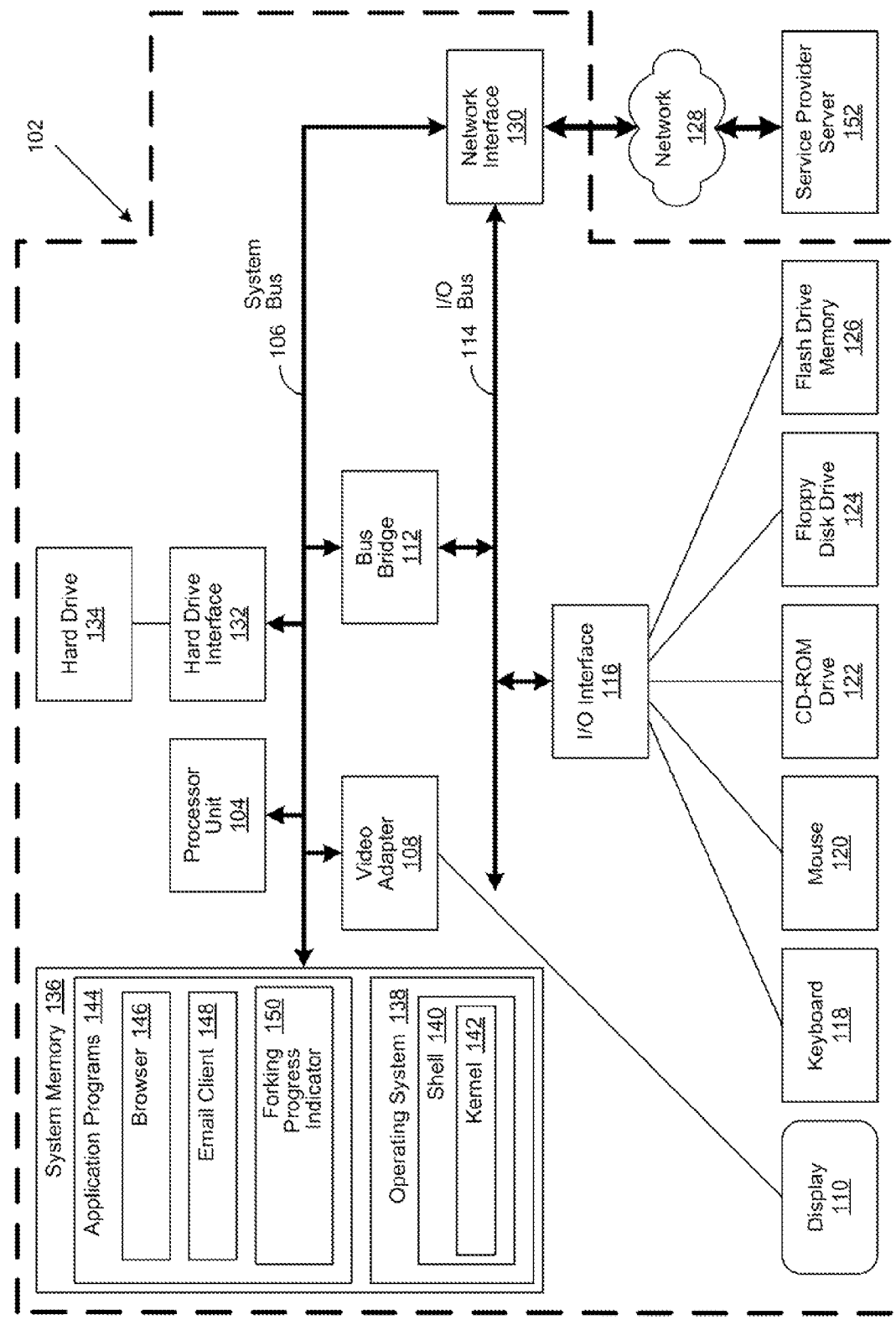
FIG. 1 depicts an exemplary client computer in which the present invention may be implemented.

A method, system and computer-usable medium are disclosed for providing graphical completion status information for the management of serial computer operations that are forked into parallel operations. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a forking progress indicator 150. The forking progress indicator 150 includes code for implementing the processes described in FIGS. 2 through 8 described hereinbelow. In one embodiment, client computer 102 is able to download the forking progress indicator 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2A:
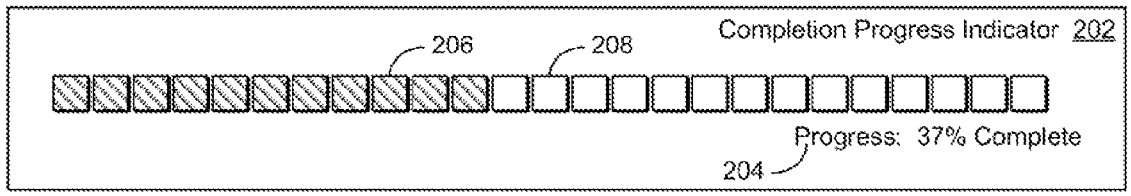
FIGS. 2a-d show progress bar indicators as used in different embodiments of the invention.

FIGS. 2a-d show progress bar indicators as used in different embodiments of the invention to represent the progress of forked computer operations. Referring now to FIG. 2a, a generalized depiction of a completion progress indicator 202 is shown as typically implemented in a graphical user interface (GUI). The completion progress indicator 202 comprises completed progress indicator segments 206 and uncompleted progress indicator segments 208, representing a completion progress 204 of 37%. Completed progress indicator segments 206 are generally depicted in a GUI as one color and uncompleted progress indicator segments 208 in another. As increments of progress are achieved, the number of completed progress indicator segments 206 increase and the number of uncompleted progress segments 208 decrease. It will be appreciated that while completion progress indicators may provide some indication of how complete a series of computer operations may be, they generally do not indicate how long it will take to complete the remaining operations.

Figure 2B:
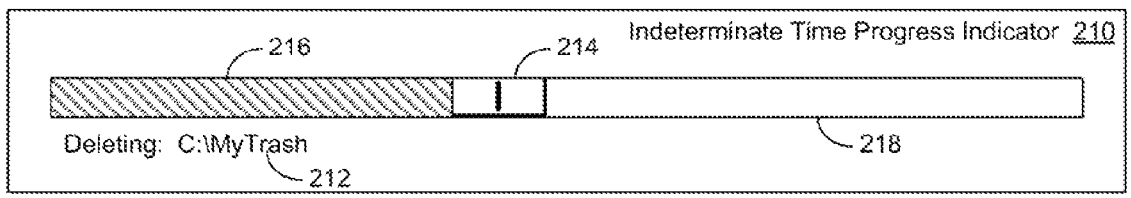

Conversely, the indeterminate time progress indicator 210 shown in FIG. 2b provides a simplified visual indication of the time remaining to complete predetermined computer operations (e.g., deleting C:\MyTrash) 212. As computer operations are completed, the slider bar 214 progresses from left to right. By observing the slider bar's 214 rate of progression, a user can achieve a general sense of how much time remains before the operations are completed. In a similar fashion, the position of the slider bar 214 indicates the proportion of completed operations 216 to uncompleted operations 218. Regardless, unlike completion progress indicator 202, indeterminate time progress indicator 210 does not provide a declarative indication of what percentage of the operations have been completed.

Figure 2C:
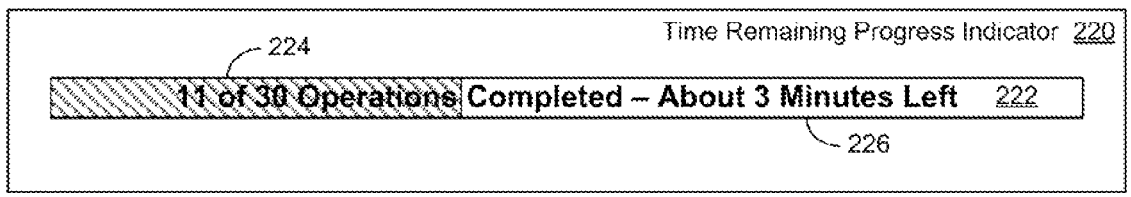

The time remaining progress indicator 210 shown in FIG. 2c provides a completion progress summary 222 of the number of completed computer operations as well as an estimate of how long it will take to complete the remaining operations. As operations are completed, they are enumerated within the completion progress summary 222 and a proportionate area 224 of the progress indicator bar changes color (e.g., from white to green, left-to-right) while the uncompleted operations area 226 is reduced accordingly. However, while the completion progress summary 222 may indicate the number of operations completed, it does not indicate the respective number of operations that were completed successfully, with errors, or with failures. Instead, the user is required to wait until all operations have been completed to determine whether or not they were successful.

Figure 2D:
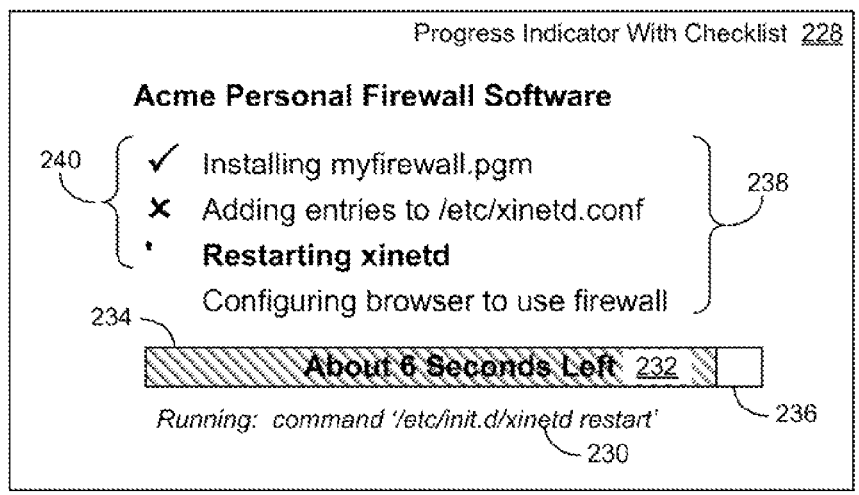

The progress indicator with checklist 228 shown in FIG. 2d combines a checklist 238 of computer operations with a time remaining progress indicator 232. As computer operations are completed, a proportionate area 234 of the progress indicator bar changes color (e.g., from white to green, left-to-right) while the uncompleted operations area 236 is reduced accordingly. The computer operation checklist 238 comprises a plurality of computer operations, each of which has a corresponding graphical icon 240 symbolizing its individual status. For example, a checkmark may signify a successfully completed operation whereas an 'X' may signify a failed or partially successful operation. Similarly, a rotating icon combined with bold text may signify a computer operation that is in progress, while absence of a graphical icon may indicate that the operation has not yet begun. Concurrently, the computer operation indicator 230 provides additional details about the computer operation that is currently in progress and may indicate whether or not the operation was successful. While the progress indicator with checklist 228 provides a summary of computer operations 238 and their corresponding status through graphical icons 240, it does not provide meaningful detail about failed operations. Furthermore, the user has no way to investigate the possible causes of failed operations while the remaining operations are being completed. Instead, they must wait until all operations have completed to determine the cause of failure.

Figure 3A:
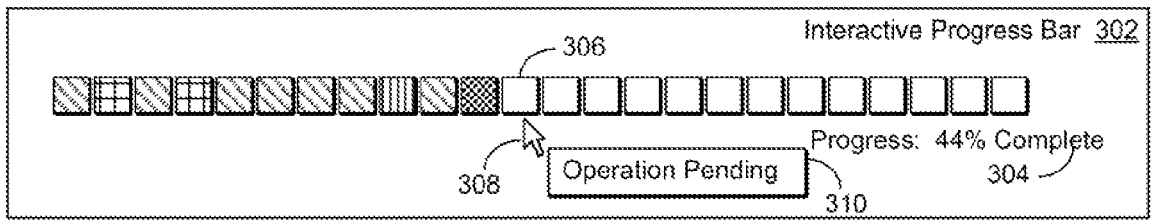
FIGS. 3a-e show an interactive progress indicator bar as used in forking operations.
Figure 3B:
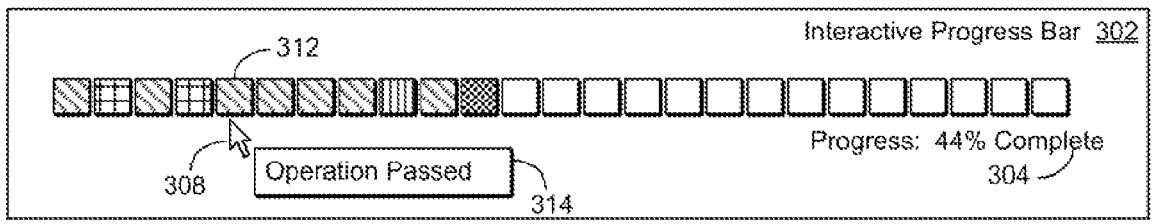

FIGS. 3a-e show an interactive progress indicator bar 302 as used in an embodiment of the invention for the management of forking operations. In various embodiments, the interactive progress indicator bar 302 comprises a plurality of progress indicator segments. As increments of progress are achieved, completion progress indicator 304 is updated to reflect the percentage of computer operations completed. Concurrently, color attributes are applied to progress indicator segments as they are completed to indicate the completion status of their associated computer operations. In one embodiment, progress indicator segment 306 is depicted in FIG. 3a with a color attribute of white, graphically indicating that its associated computer operation is pending and has not been completed. Supplemental textual status "Operation Pending" 310 is provided through a user gesture such as a mouse hover or right-click as the cursor 308 is placed over corresponding progress indicator segment 306. Similarly, progress indicator segment 312 is depicted in FIG. 3b with a color attribute of green, graphically indicating that its associated computer operation is successfully completed. Supplemental textual status "Operation Passed" 314 is likewise provided through a user gesture as the cursor 308 is placed over corresponding progress indicator segment 312.

Figure 3C:
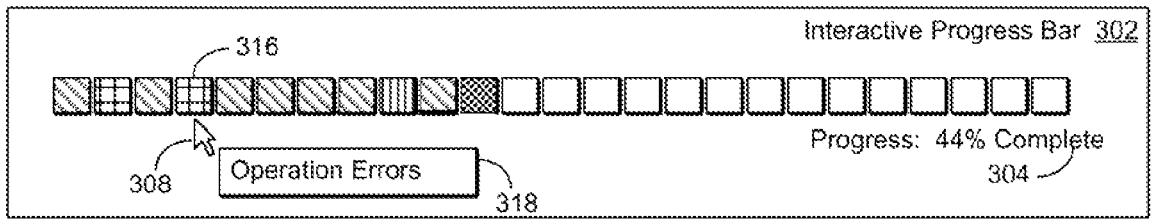
Figure 3D:
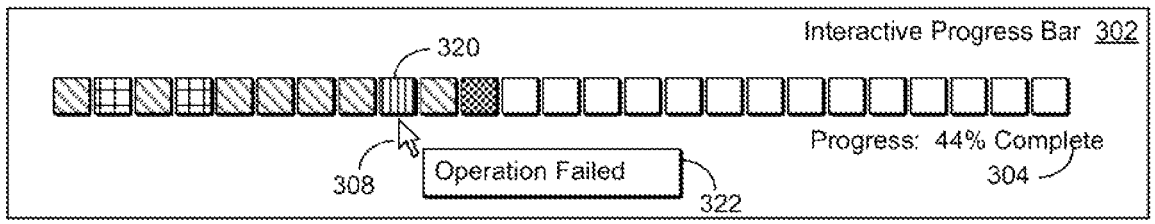
Figure 3E:
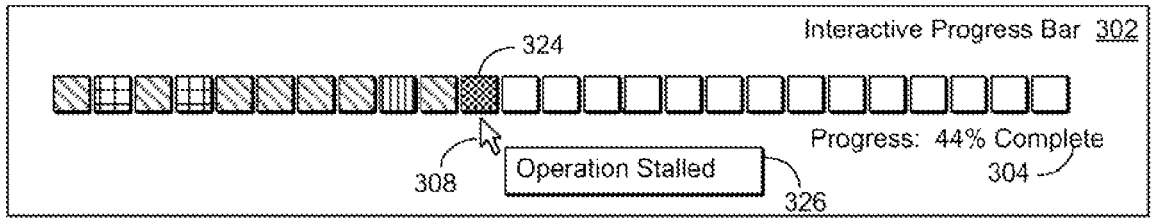

In a like manner, progress indicator segment 312 is depicted in FIG. 3c with a color attribute of yellow, graphically indicating errors were incurred during its associated computer operation. As in the preceding cases, supplemental text status "Operation Errors" 318 is provided through the user gestures described herein. Likewise, progress indicator segment 320 is depicted in FIG. 3d with a color attribute of red, graphically indicating a failed computer operation. Placing cursor 308 over progress indicator segment 320 through a user gesture results in supplemental text status "Operation Failed" 322 being displayed. In a similar manner, progress indicator segment 324 is depicted in FIG. 3e with a color attribute of grey, graphically indicating a computer operation that is in a stalled state. Placing the cursor 308 over progress indicator segment 324 with a user gesture results in supplemental textual status "Operation Stalled" 326 being displayed. It will be apparent to those of skill in the art that the application of color attributes to progress indicator segments allows a user to quickly ascertain the completion status of their corresponding computer operation. Further, the completion status of individual computer operations can be textually displayed without waiting for remaining computer operations to be completed.

FIGS. 4a-c show a simplified block diagram of computer operations to be reordered prior to their completion. In one embodiment, computer operations 400 comprise operations 'A' (install database) 402, 'B' (install database service pack) 404, 'C' (install LDAP server) 406, 'D' (install HTTP server) 408, 'E' (configure heap) 410, 'F' (close applications) 412, and 'G' (delete installation files and clean up) 414. As shown in FIG. 4a, the order of computer operations 400 is to be changed such that operation 'D' (install HTTP server) 408 is moved 416 to occur after the completion of operation 'A' (install database) 402. However, as shown in FIG. 4b, the installation policy 422 enforces dependency association 418, which requires operation 'B' (install database service pack) be performed after the completion of operation 'A' (install database) 402 and a prerequisite to performing other operations. Furthermore, the installation policy 422 also enforces dependency association 420, which requires operation 'E' (configure heap) 410 be performed after the completion of operation 'D' (install HTTP server) 408 and prior to performing other operations. As a result, operations 'A' (install database) 402 and 'B' (install database service pack) 404 must remain contiguous, and likewise, operations 'D' (install HTTP server) 408 and 'E' (configure heap) 410 must remain contiguous. As shown in FIG. 4c, the resulting order of computer operations 400 after reordering becomes: 'A' (install database) 402, 'B' (install database service pack) 404, 'D' (install HTTP server) 408, 'E' (configure heap) 410, 'C' (install LDAP server) 406, 'F' (close applications) 412, and 'G' (delete installation files and clean up) 414.

FIGS. 5a-e show an interactive progress bar 502 as implemented to reorder forking computer operations prior to their completion. In various embodiments, the interactive progress bar 502 is implemented in a graphical user interface (GUI) and comprises a plurality of progress indicator segments 504. As computer operations are completed, the details of their completion status are entered into a computer operation log and indexed to their corresponding progress indicator segments 504. Color attributes are applied to progress indicator segments as they are completed to graphically indicate the completion status of their associated computer operations. For example, a color attribute of green may signify a successfully completed operation, yellow a completed operation with errors, and red a failed operation. As increments of progress are achieved, completion progress indicator 534 is updated to textually reflect the percentage of completed computer operations. Concurrently, the slider bar 532 progresses from left to right, a proportionate amount of the completed operations area of the progress indicator bar changes color (e.g., from white to green), and the uncompleted operations area 530 is reduced accordingly.

Figure 5A:
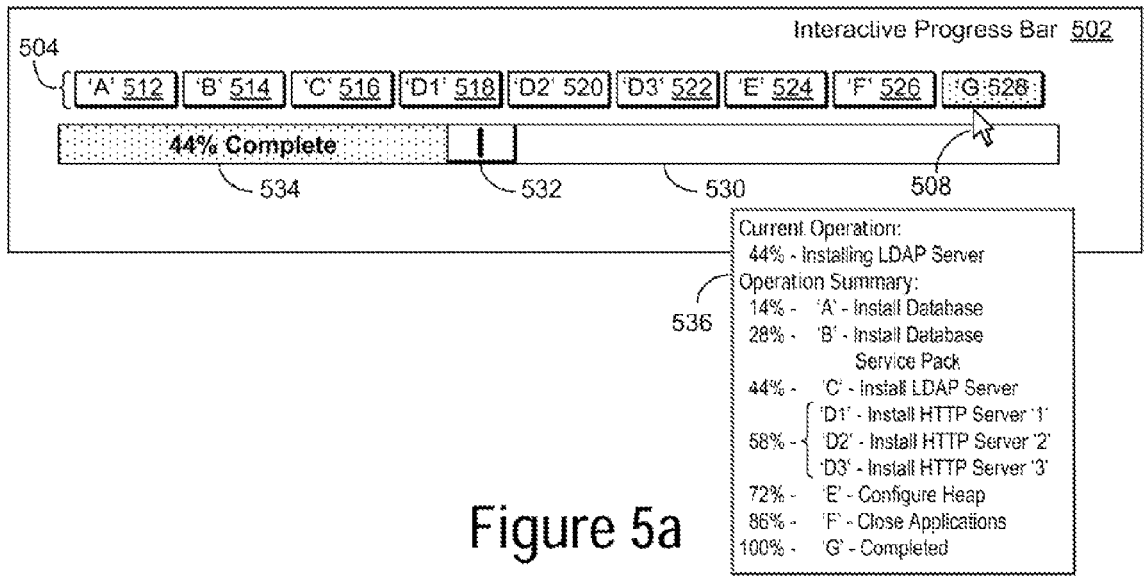
FIGS. 5a-e show an interactive progress bar as implemented to reorder forking computer operations prior to their completion.

In one embodiment, progress indicator segments 504 comprise segments 'A' 512, 'B' 514, 'C' 516, 'D1' 518, 'D2' 520, 'D1' 522, 'E' 524, 'F' 526, and 'G' 528, each of which correspond to a predetermined computer operation. A summary list of computer operations is displayable through a user gesture such as a mouse hover or right-click as the cursor 508 is placed over the progress indicator segment 'G' 528 corresponding to the last computer operation to be completed. As shown in FIG. 5a, the operations summary list is appended to the current operation displayed in the operation information window 536. In this embodiment, the position of slider bar 532 relative to progress indicator segment 'C' 516 indicates that computer operations are 44% complete. Cross-referencing the current completion status 534 of 44% to the operations summary list displayed in operation information window 536 indicates that the current computer operation is to install an LDAP server. A decision to change the order of the computer operations may involve moving or reordering prerequisite and dependent computer operations at the same time. Whether or not a predetermined computer operation has prerequisite or dependent operations is determined through a user gesture such as a mouse right-click as the cursor 508 is placed over the progress indicator segment corresponding to the candidate computer operation.

Figure 5B:
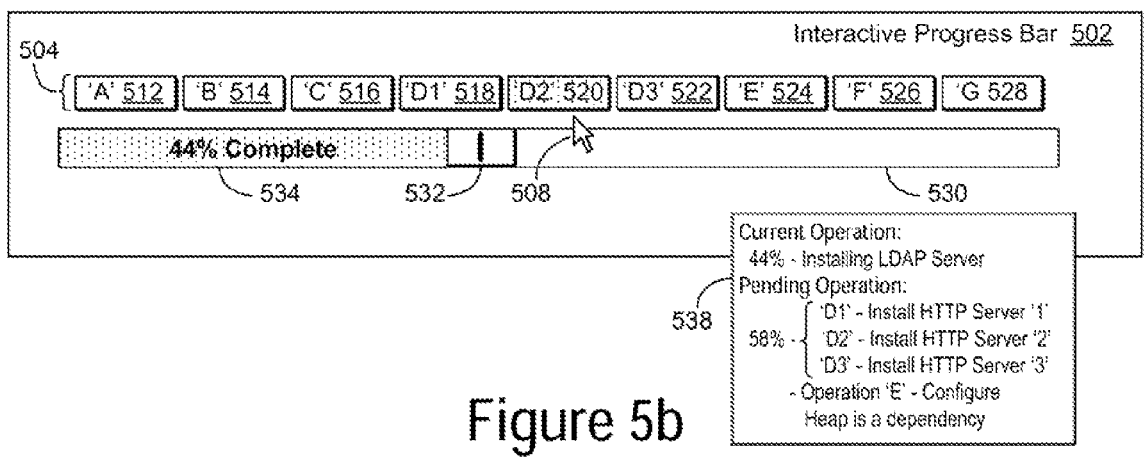
Figure 5C:
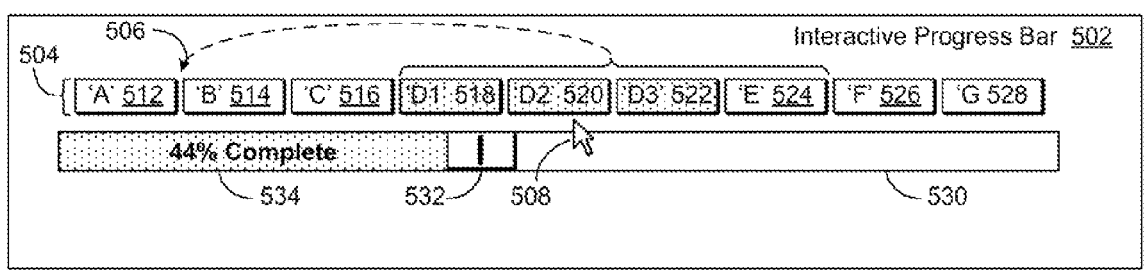

As shown in FIG. 5b, a user gesture, such as placing the cursor 508 over the progress indicator 'D2' 520, results in summary and dependent operation information being displayed in the operation information window 538. Since operation 'E' (configure heap) is denoted as an operation that is dependent to operation 'D2' (install HTTP server '2') in operation information window 538, any movement of operation 'D2' will result in a corresponding movement of operation 'E'. Accordingly, as shown in FIG. 5c, when progress indicator segment 'D2' 518 is moved 506 along with 'D1' 518 and 'D3' 522 through a user gesture such as a drag and drop to their target location subsequent to progress indicator segment 'A' 512, progress indicator segment 'E' 520 will be moved as well. As a result, the dependent association of operation 'E' (configure heap) is maintained with operation 'D2' (install HTTP server '2') during the reorder operation.

Figure 5D:
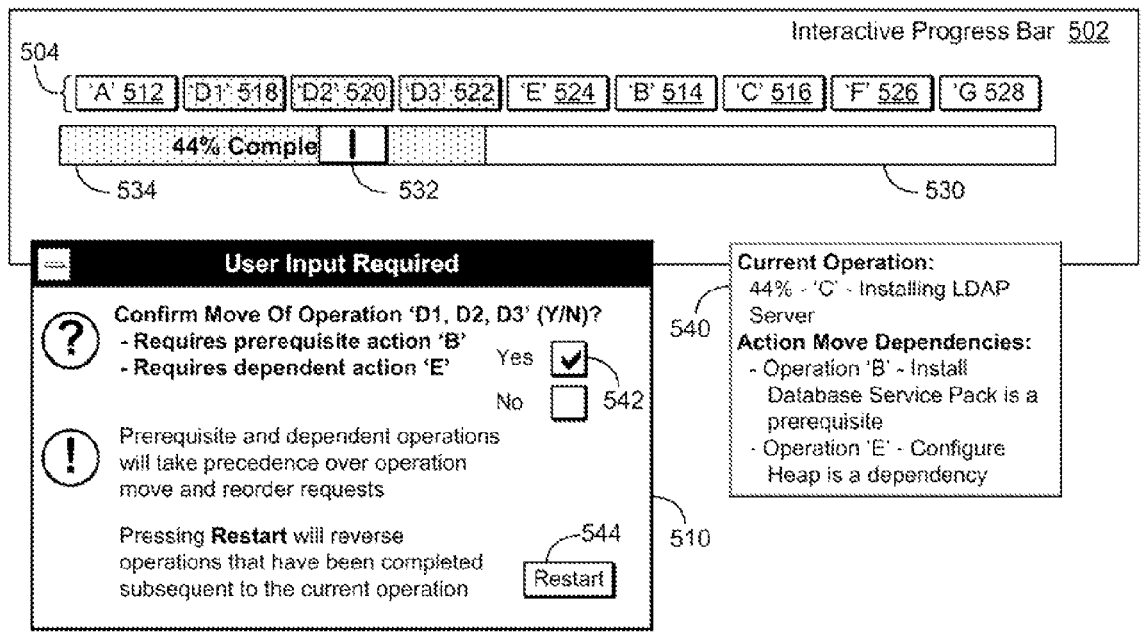

As shown in FIG. 5d, moving progress indicator segments 'D1' 518, 'D2' 520 and 'D3' 522 to their target location has resulted in the corresponding movement of progress indicator segment 'E' 520. Concurrently, computer operations that are in progress have been halted, the slider bar 532 is now positioned underneath the reordered progress indicator segment 'D2' 520, and user dialog box 510 has been opened. Once opened, dialog box 510 prompts the user to confirm the move of operation 'D2', noting that by choosing "Yes" 542, prerequisite and dependent operations will take precedence over requested move and reorder operations. At the same time, summary, prerequisite and dependent operation information is displayed in the operation information window 540. Since operation 'B' (install database service pack) is denoted as an operation that is prerequisite to operation 'D2' (install HTTP server '2'), confirmation of the move of operation 'D1, D2, D3' will result in a corresponding movement of operation 'B' to precede operation 'D1, D2, D3'.

As a result, the resulting order of progress indicator segments and their corresponding computer operations will become: 'A' (install database) 512, 'B' (install database service pack) 514, 'D1' (install HTTP server '1') 518, 'D2' (install HTTP server '2') 520, 'D3' (install HTTP server '3') 522, 'E' (configure heap) 524, 'C' (install LDAP server) 516, 'F' (close applications) 526, and 'G' (delete installation files and clean up) 528. The user is then notified that pressing the restart button 544 in dialog box 510 will result in the reversal of operations that were previously completed subsequent to the new current operation. Once the operations are restarted, the current completion status 534 is reduced to 28% and the area of the progress indicator bar previously indicating completed operations is now denoted as "reversed" 544.

Figure 5E:
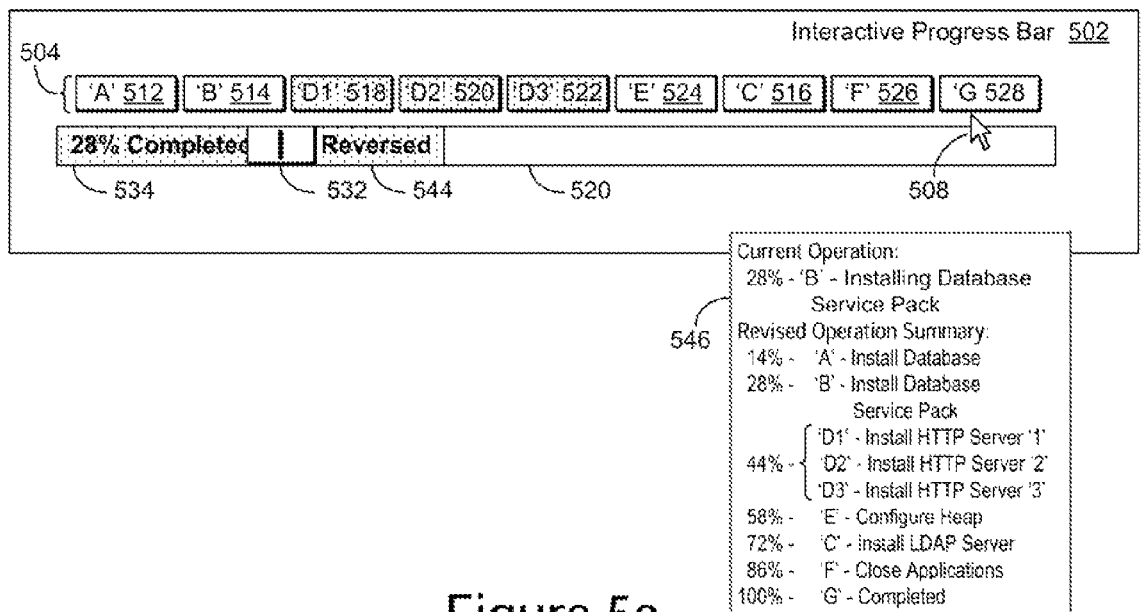

As shown in FIG. 5e, a revised summary list of computer operations is now displayable through a user gesture as the cursor 508 is placed over the progress indicator segment 'G' 528 corresponding to the last computer operation to be completed. The revised operations summary list appended to the current operation ('B'—installing database service pack) displayed in the revised operation information window 546 now reflects the new order of the progress indicator segments 504. It will be appreciated by those of skill in the art that the ability to reorder computer operations before the remaining operations are completed is advantageous, especially when the operations are large in number or time consuming to complete.

Figure 6:
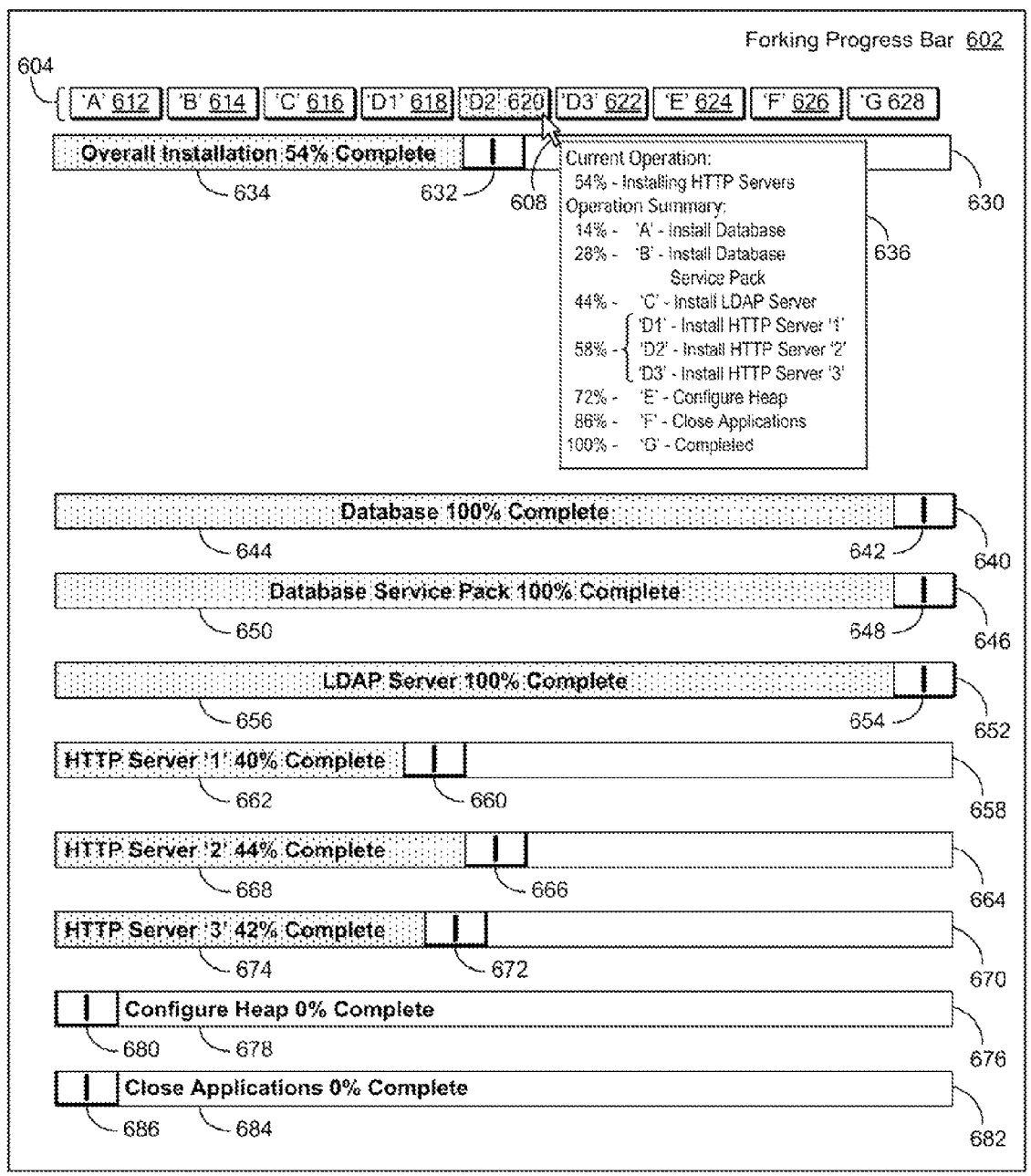
FIG. 6 shows a forking progress bar as implemented to manage the execution of a plurality of computer operations.

FIG. 6 shows a forking progress bar 602 as implemented in an embodiment of the invention to manage the execution of a plurality of computer operations. In this embodiment, a composite application is represented by a plurality of progress bar indicator segments 604. The overall installation progress of the composite application is represented by a primary interactive progress indicator bar 630. As the composite application's computer operations are completed, the details of their completion status are entered into a computer operation log and indexed to their corresponding progress indicator segments 604. Color attributes are applied to progress indicator segments as they are completed to graphically indicate the completion status of their associated computer operations. As increments of progress are achieved, completion progress indicator 634 is updated to textually reflect the percentage of completed computer operations. Concurrently, the slider bar 632 progresses from left to right, a proportionate amount of the completed operations area of the progress indicator bar changes color, and the uncompleted operations area is reduced accordingly.

A summary list of the composite application's elements and computer operations is displayable through a user gesture such as a mouse hover or right-click as the cursor 608 is placed over the progress indicator segment 'D2' 620 corresponding to the current element or computer operation. As shown in FIG. 6, the operations summary list is appended to the current operation displayed in the operation information window 636. In this embodiment, the position of slider bar 632 relative to progress indicator segment 'D2' 620 indicates that installation of the composite application is 54% complete. Cross-referencing the current completion status 634 of 54% to the operations summary list displayed in operation information window 636 indicates that the current computer operation is to install a hypertext transfer protocol (HTTP) server 'D2'.

Progress indicator segments 604 comprise segments 'A' 612, 'B' 614, 'C' 616, 'D1' 618, 'D2' 620, 'D1' 622, 'E' 624, 'F' 626, and 'G' 628, each of which corresponds to a predetermined element or computer operation of the composite application. Similarly, each of the progress indicator segments 604 corresponds to a secondary interactive progress indicator bar that displays the progress of its respective composite application element or computer operation. Accordingly, progress indicator segments 'A' 612, 'B' 614, 'C' 616, 'D1' 618, 'D2' 620, 'D1' 622, 'E' 624, 'F' 626, and 'G' 628 respectively correspond to secondary interactive progress indicator bars 640, 646, 652, 658, 664, 670, 676, and 682.

As each element or computer operation is executed, a second interactive progress indicator bar 640, 646, 652, 658, 664, 670, 676, and 682 is implemented. In some embodiments, the elements or computer operations are executed serially and may require that prerequisite or dependent operations are performed for their completion. As an example, computer operations 'A'—install database, 'B'—install database service pack, and 'C'—install lightweight directory access protocol (LDAP) server require serial execution. Those of skill in the art will appreciate that the database has to be installed before its service pack and that the LDAP server requires the database to operate. The progress of computer operation 'A'—install database, is represented by the secondary interactive progress indicator bar 640. As shown in FIG. 6, installation of the database is indicated to be complete by the text and visual attributes of the completed operations area 644 of the secondary progress indicator bar 640 and the position of its corresponding slider bar 642. Likewise, the progress of computer operation 'B'—install database service pack, is represented by the secondary interactive progress indicator bar 646. Installation of the database service pack is indicated to be complete by the completed operations area 650 of the secondary progress indicator bar 646 and its corresponding slider bar 644. Similarly, the progress of computer operation 'C'—install LDAP server, is represented by the secondary interactive progress indicator bar 652. Installation of the LDAP server is indicated to be complete by the completed operations area 656 of the secondary progress indicator bar 652 and its corresponding slider bar 654.

In other embodiments, predetermined elements may be executed in parallel. For example, computer operations 'D1'—install HTTP server '1', 'D2'—install HTTP server '2', and 'D3'—install HTTP server '3' are typically be performed in parallel, either on separate physical machines or on separate virtual machines. In these embodiments, forking operations are performed and a second interactive progress indicator bar is implemented for each element in parallel. As shown in FIG. 6, the installation progress of computer operation HTTP server '1' is represented by the secondary interactive progress indicator bar 658. Similarly, the installation progress of computer operation HTTP server '1' and HTTP server '2' is respectively represented by secondary interactive progress indicator bars 664 and 670. The progress of the installation of HTTP server '1', '2', and '3' is indicated to be respectively 40%, 44%, and 42% by the text and visual attributes of the completed operations area 662, 668, 674 of the secondary progress indicator bars 658, 664, 670, and the position of their corresponding slider bars 660, 668, 674.

In a similar fashion, composite application elements or computer operations 'E'—configure heap and 'F'—close applications are respectively represented by secondary interactive progress indicator bars 676 and 682. The progress of these two elements is indicated to be 0% by the text and visual attributes of the completed operations area 678, 684 of the secondary progress indicator bars 676, 682, and the position of their corresponding slider bars 680, 686. In one embodiment, each of the secondary interactive progress indicator bars 640, 646, 652, 658, 664, 670, 676, and 682 further comprise progress indicator segments. As computer operations are completed, the details of their completion status are entered into a computer operation log and indexed to their corresponding progress indicator segments.

Figure 7A:
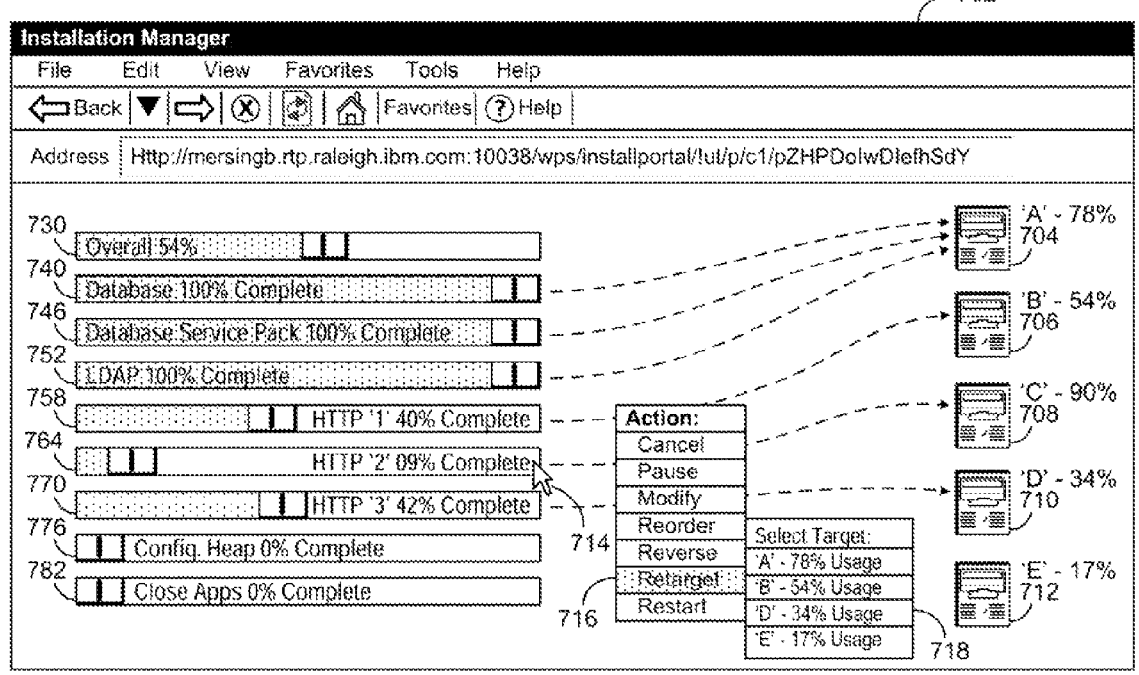
FIGS. 7a-b show a forking progress bar as implemented within a graphical user interface (GUI) to retarget the assignment of a forked computer operation.
Figure 7B:
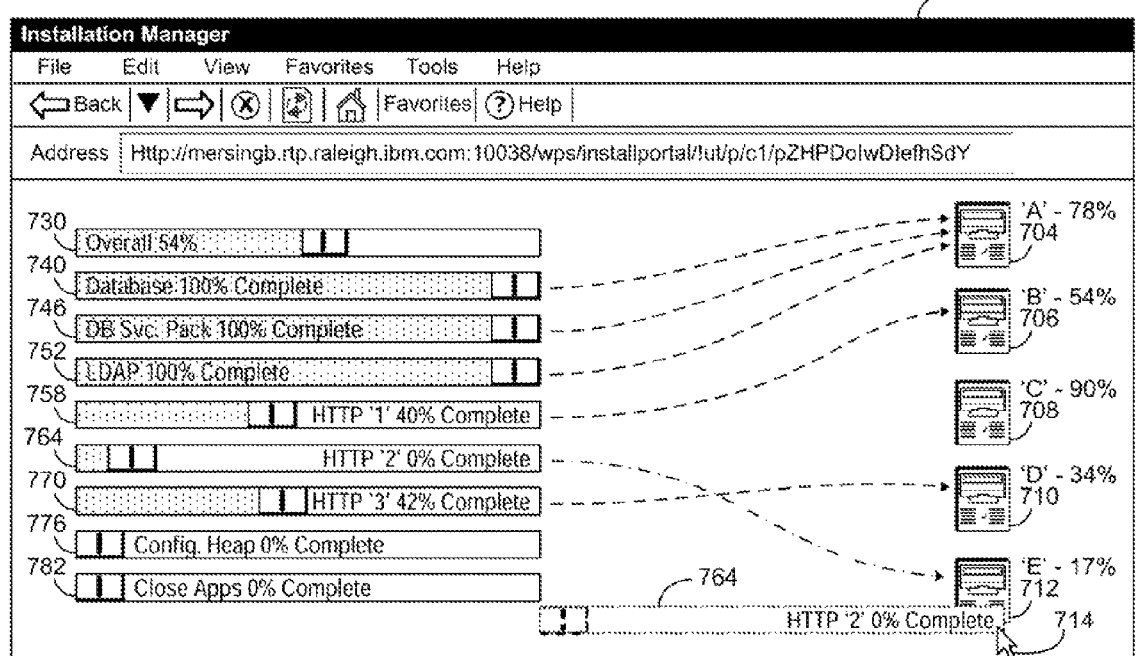
Figure 8A:
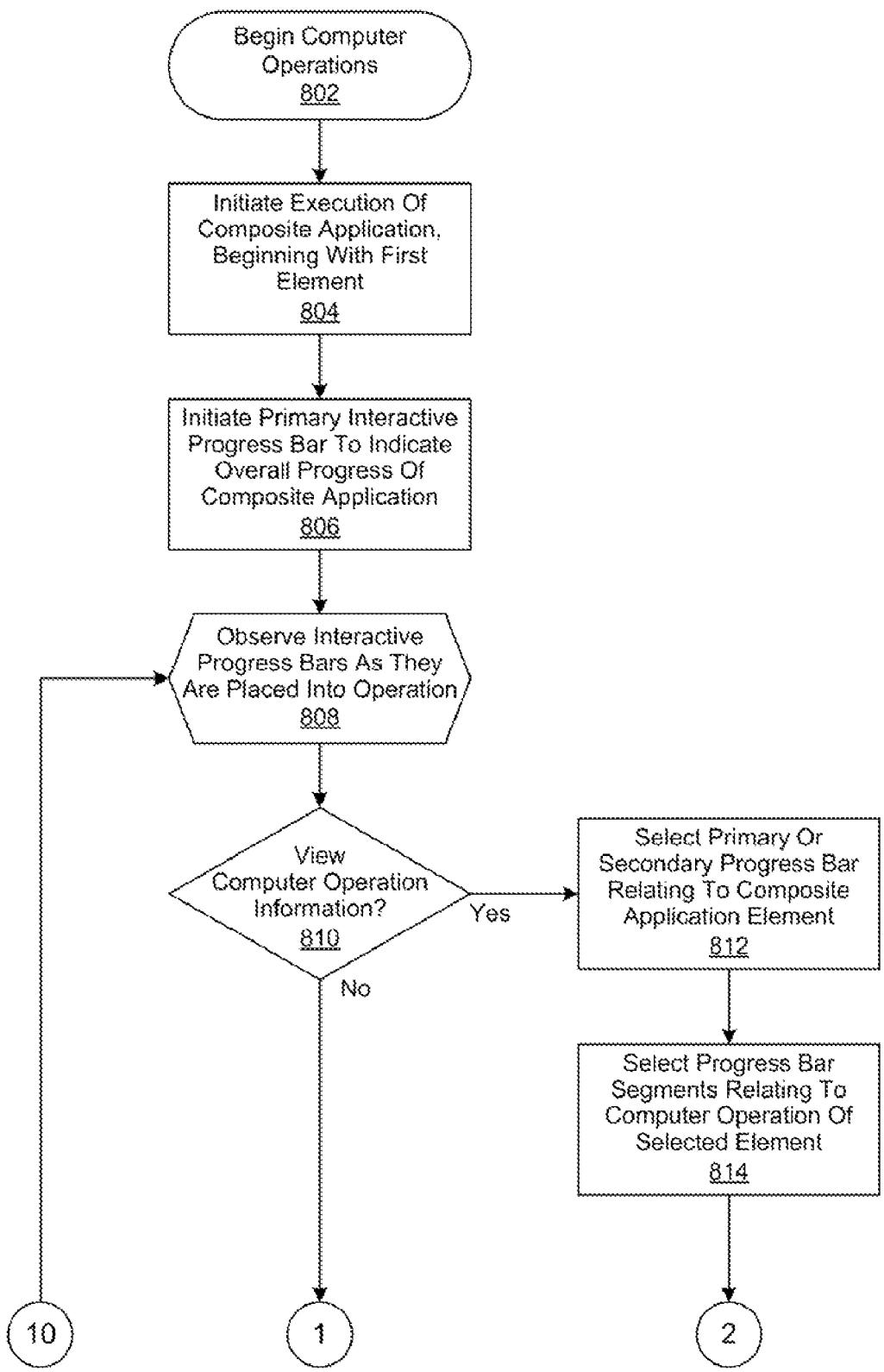
FIG. 8 is a generalized flow chart showing a forking progress bar as implemented to manage the execution of a plurality of computer operations.
Figure 8B:
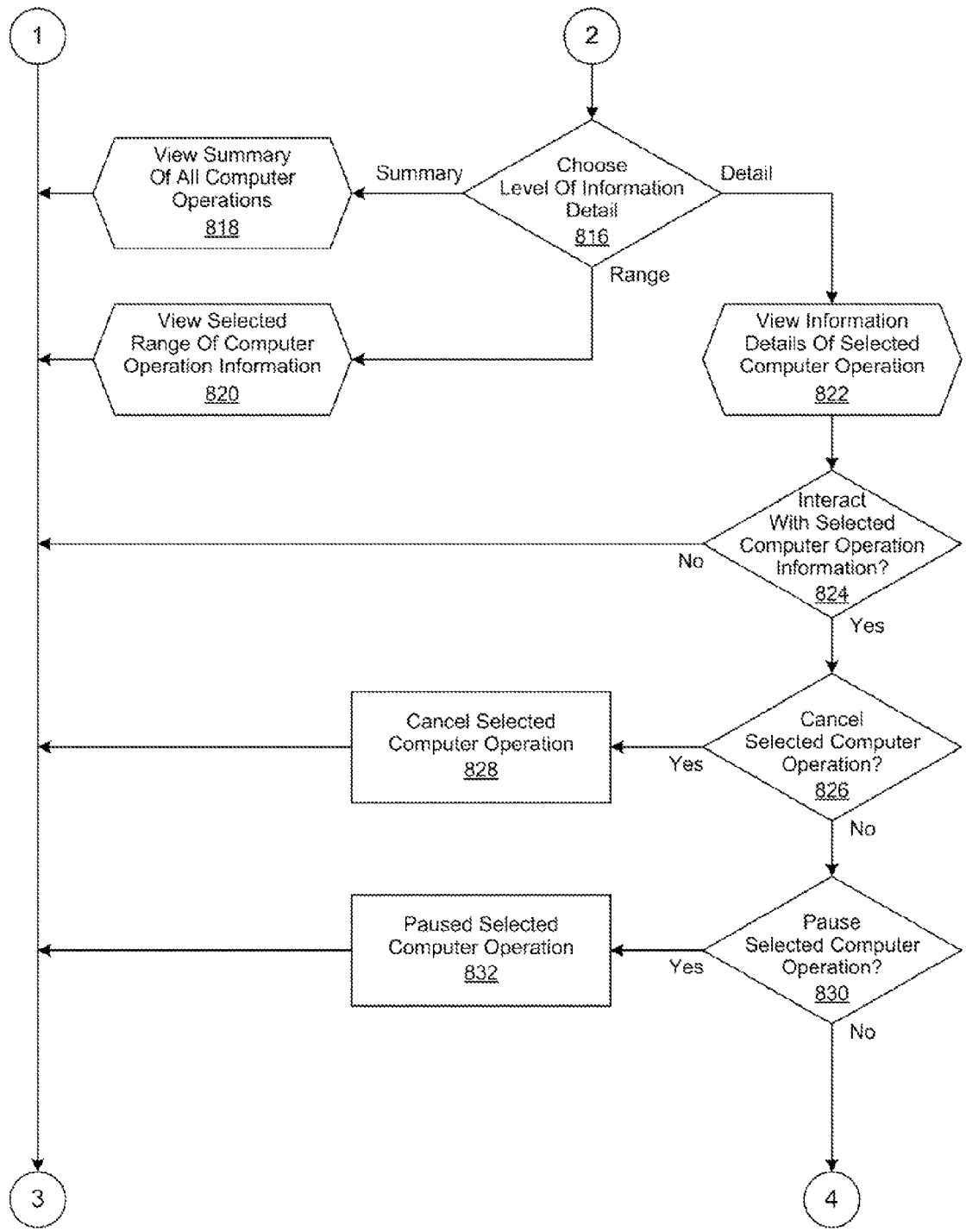
Figure 8C:
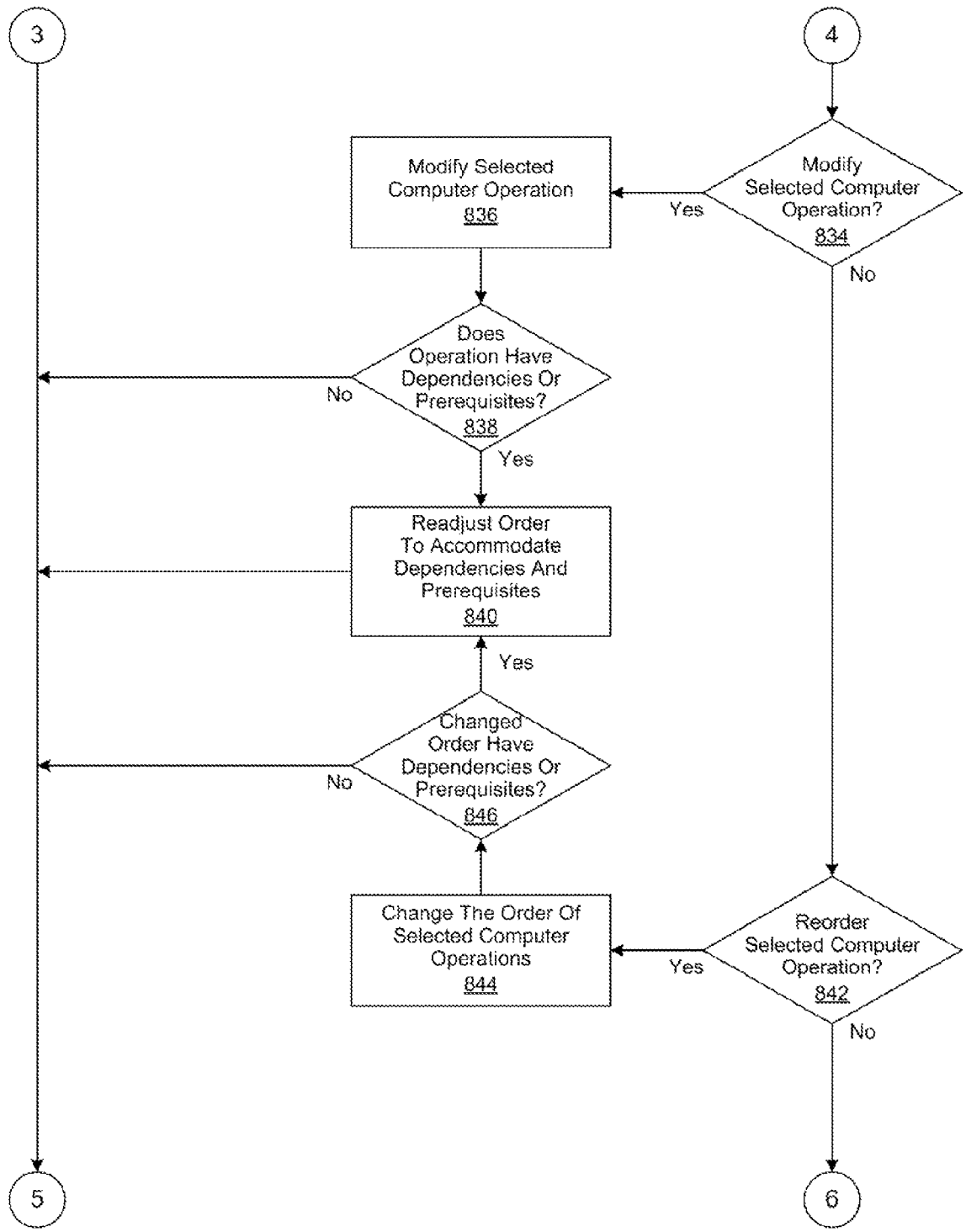
Figure 8D:
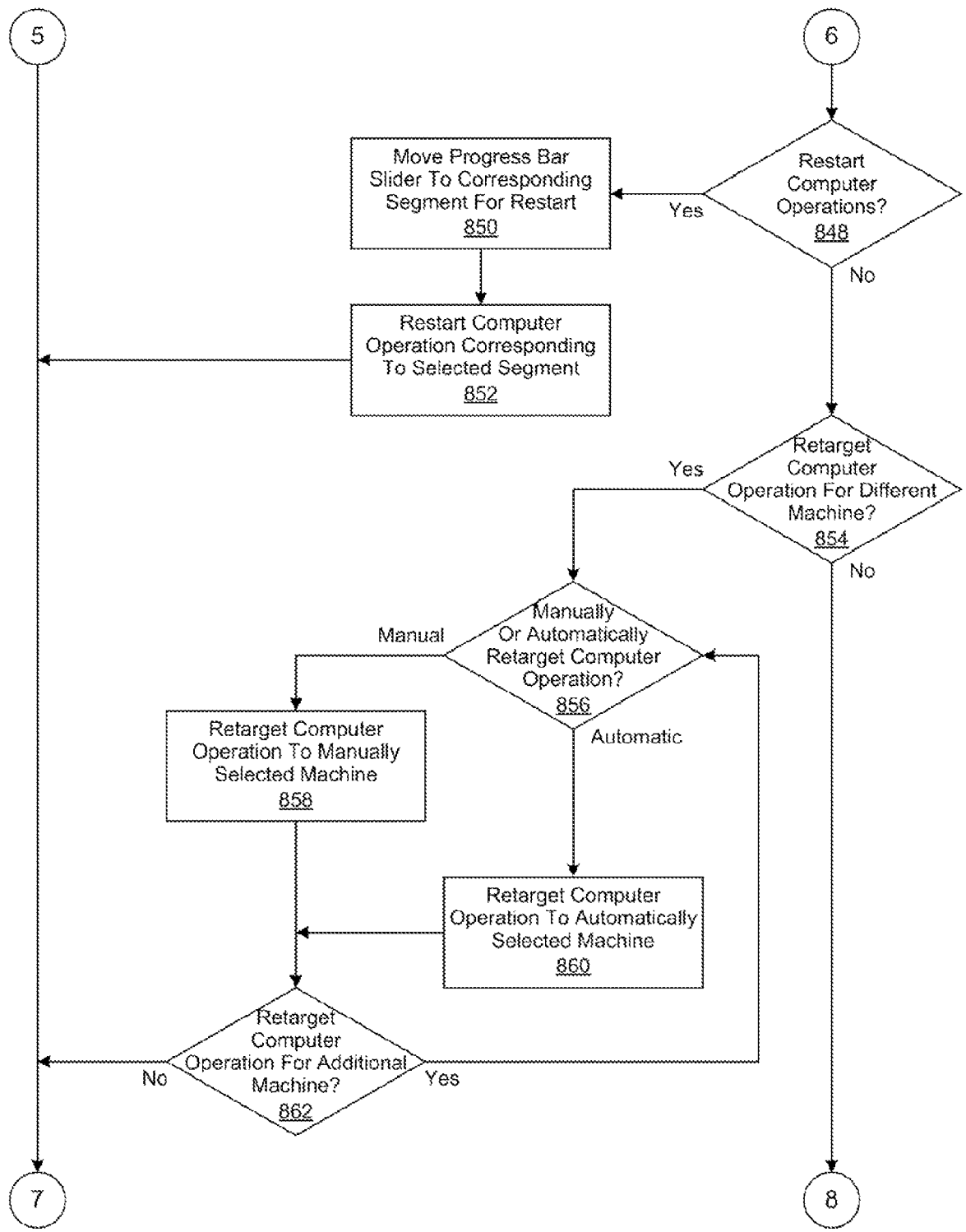
Figure 8E:
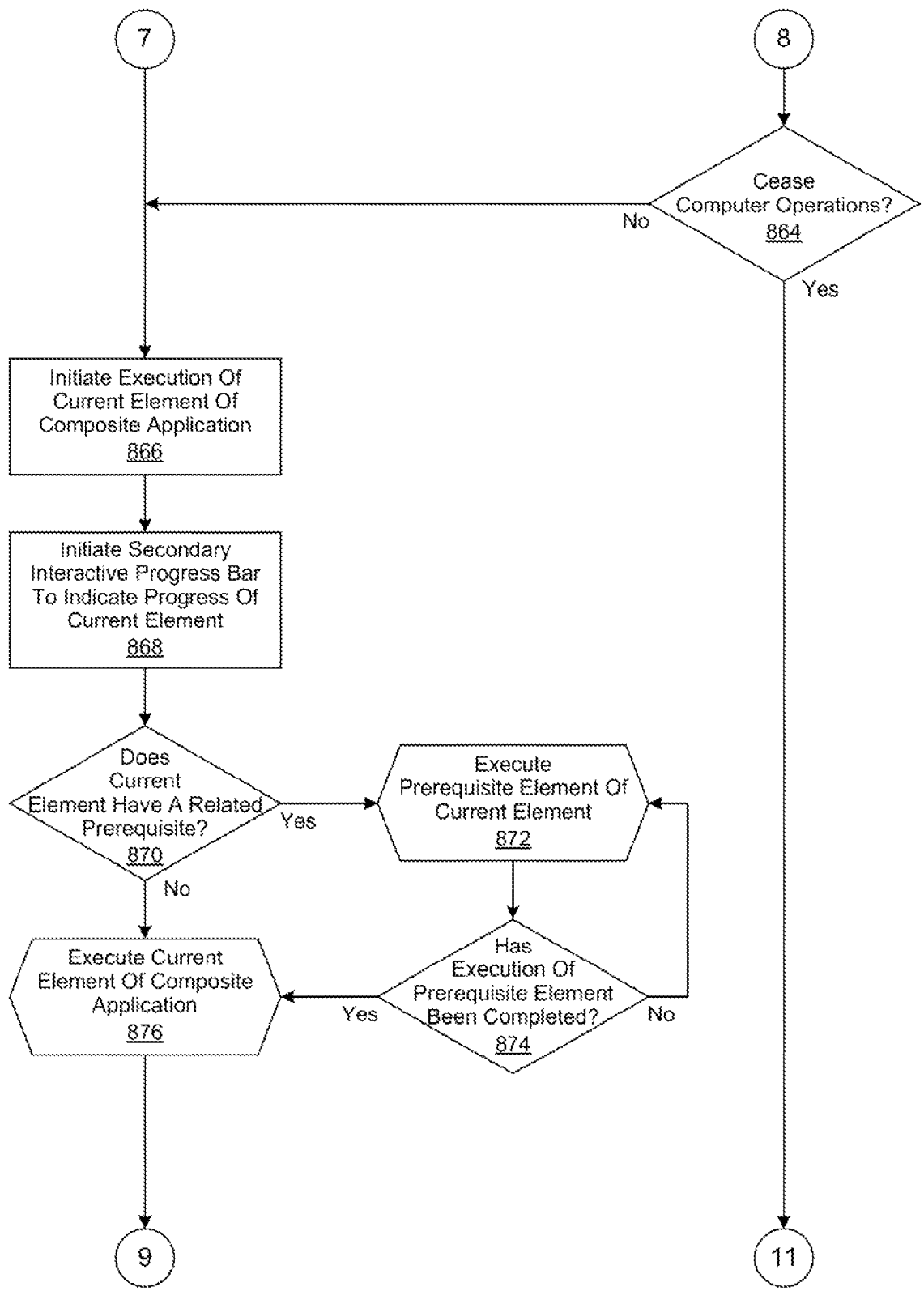
Figure 8F:
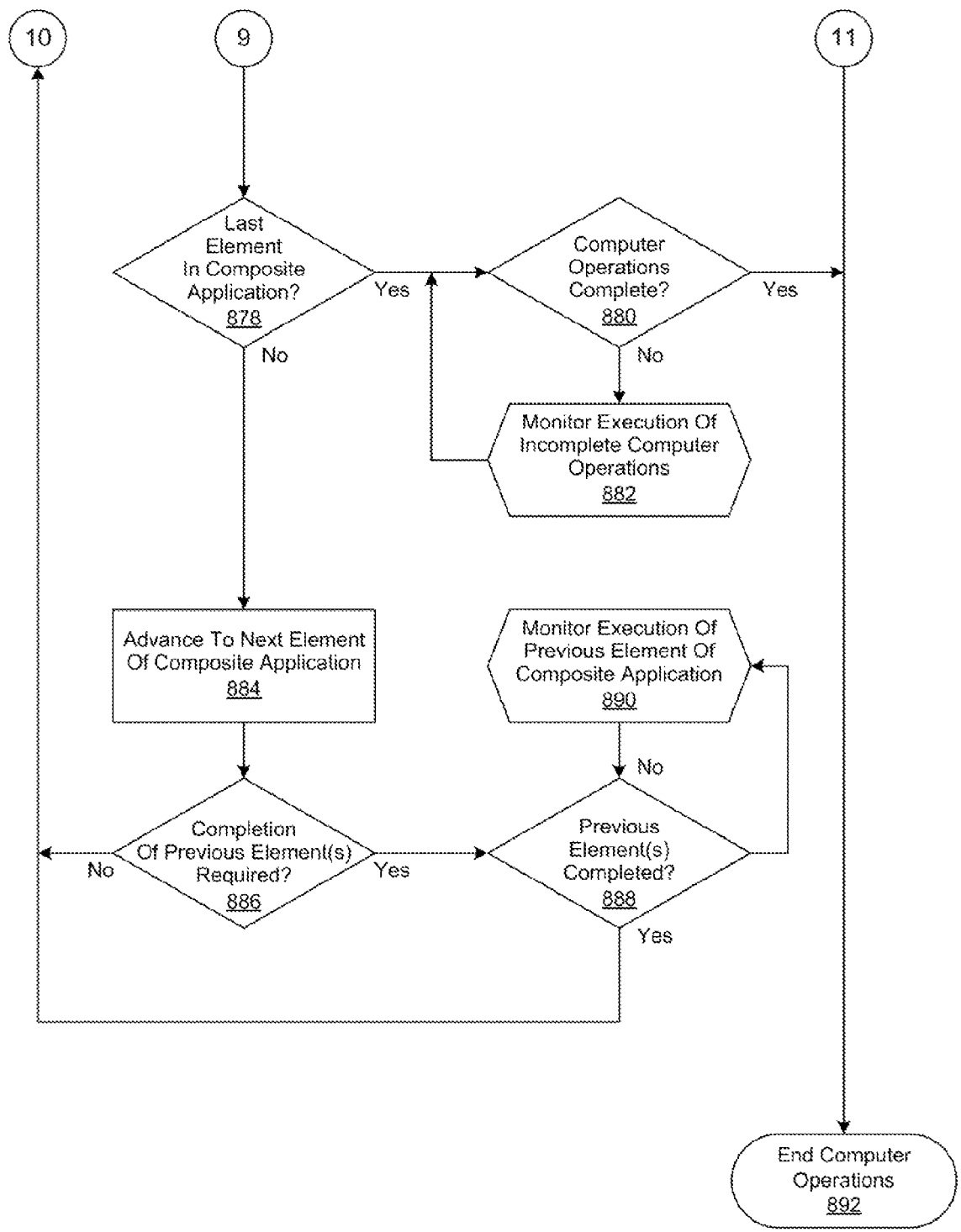

FIGS. 7a-b show a forking progress bar as implemented within a graphical user interface (GUI) 702 to retarget the assignment of a forked computer operation. As shown in FIG. 7a, GUI 702 comprises a primary interactive progress indicator bar 730 that displays the overall installation progress of a composite application. Secondary interactive progress indicator bars 740, 746, 752, 758, 764, 770, 776, and 782 respectively display the installation progress of each element or computer operation of the composite application. Target machines for the respective installation of each element or computer operation are represented by icons 'A' 704, 'B' 706, 'C' 708, 'D' 710, and 'E' 712.

As each element or computer operation is executed, a second interactive progress indicator bar 740, 746, 752, 758, 764, 770, 776, and 782 is implemented. In some embodiments, the elements or computer operations are executed serially and may require that prerequisite or dependent operations are performed for their completion. As an example, computer operations 'A'—install database, 'B'—install database service pack, and 'C'—install lightweight directory access protocol (LDAP) server require serial execution. As shown in FIG. 7a, each of these elements has been targeted for installation on machine 'A' 704, operating at 78% capacity. As indicated by the text and visual attributes of secondary progress indicator bars 740, 746, and 752, installation has been completed.

In other embodiments, predetermined elements may be executed in parallel. For example, computer operations to install HTTP server '1', '2', and '3' are typically be performed in parallel, either on separate physical machines or on separate virtual machines. In these embodiments, forking operations are performed and a secondary interactive progress indicator bar 758, 764, and 770 is implemented for each element in parallel. As shown in FIG. 7a, HTTP server '1' is targeted for machine 'B' 706, operating at 54% resource usage, HTTP server '2' is targeted for machine 'C' 708, operating at 90% resource usage, and HTTP server '3' is targeted for machine 'D' 710, operating at 34% resource usage. The installation progress of computer operation HTTP server '1', '2', and '3' are respectively indicated to be at 40%, 09%, and 42% by their corresponding secondary interactive progress indicator bars 758, 764, and 770. Accordingly, a correlation can be made between installation progress (09%) of HTTP server '2' and the corresponding resource usage (90%) of its target machine 'C' 708.

A determination is made whether the installation of HTTP server '2' is to be retargeted to machine 'E' 712, which is indicated to be operating at 17% of resource usage. In one embodiment, the secondary interactive progress indicator bar 764 is selected through a user gesture, such as a mouse right-click with cursor 714, which opens an operation options menu 716. The user selects "retarget operation" from the operation options menu 716, which pauses the installation of HTTP server '2'. A dialog window 718 is opened, displaying the available resources of the target machines. The user then selects machine 'E', operating at 17% resource usage, as the target machine with another user gesture. The installation of HTTP server '2' is then retargeted to machine 'E' 712 and installation operations resume. The progress of the installation is then displayed on the secondary interactive progress indicator bar 764 as being reset to 0% after machine 'E' 712 is selected. In another embodiment, the secondary interactive progress indicator bar 764 is selected through a user gesture, such as a mouse click-and-hold with cursor 714. As shown in FIG. 7b, the secondary interactive progress indicator bar 764 is then dragged across the GUI and dropped on the icon representing the machine 'E' 712. The installation of HTTP server '2' is then retargeted to machine 'E' 712 and installation operations resume. The progress of the installation is then displayed on the secondary interactive progress indicator bar 764 as being reset to 0% after it is dropped on machine 'E' 712.

FIG. 8 is a generalized flow chart showing a forking progress bar as implemented to manage the execution of a plurality of computer operations. In various embodiments, a first interactive progress indicator bar is implemented in a graphical user interface (GUI) to show the completion progress of a composite application comprising other applications, sub-applications, modules, components, and other elements. The first interactive progress indicator bar comprises a plurality of progress indicator segments, each of which corresponds to an element of the composite application. As each element is executed, a second interactive progress indicator bar is implemented within the GUI. In some embodiments, the elements are executed serially and may require that prerequisite or dependent operations are performed for their completion. In other embodiments, predetermined elements may be executed in parallel. In these embodiments, forking operations are performed and a second interactive progress indicator bar is implemented for each element in parallel.

Each of the second interactive progress indicator bars further comprise progress indicator segments. As computer operations are completed, the details of their completion status are entered into a computer operation log and indexed to their corresponding progress indicator segments. Concurrently, color attributes are applied to progress indicator segments as they are completed to graphically indicate the completion status of their associated computer operations. For example, a color attribute of green may signify a successfully completed operation, yellow a completed operation with errors, and red a failed operation. As increments of progress are achieved, a completion progress indicator is updated to textually reflect the percentage of completed computer operations.

In this embodiment, computer operations are begun in step 802. In step 804, the execution of a composite application is initiated, beginning with the first element. A primary interactive progress is then initiated in step 808 to indicate the overall progress of the execution of the composite application. Interactive progress bars are then observed in step 808 as they are placed into operation.

A determination is then made in step 810 whether to view information relating to the computer operations of the composite application. If so, then a primary or secondary interactive progress indicator bar is selected in step 812. As described in greater detail herein, a primary interactive progress indicator bar comprises progress indicator segments corresponding to each of the composite application's elements. Each element corresponds to a secondary interactive progress indicator, which further comprises its own progress indicator segments. Each of these segments corresponds to predetermined computer operations that make up the element. One or more of these progress indicator segments are selected in step 814.

Once one or more of these progress indicator segments are selected, a level of computer operation detail is chosen in step 816. If a summary level of information is chosen in step 816, then a summary list of computer operation is displayed in step 818 through a first user gesture such as a mouse hover or right-click as the cursor is placed over the last progress indicator segment of the interactive progress bar. Once review of the computer operation summary list is completed, observation of the primary and secondary interactive progress bars continues, beginning with step 808. If detail information for a predetermined range of computer operations is chosen in step 816, then a first user gesture such as a mouse click-and-drag is used to highlight the progress indicator segments corresponding to the selected range of computer operations. Detail information for the range of operations is then displayed in step 820 as a result of a second user gesture such as selecting a menu command displayed as the result of a mouse right-click. Once review of the detail information for the range of computer operations is complete, observation of the interactive progress bars continues, beginning with step 808.

If detail information for a predetermined computer operation is chosen in step 816, then the detail information is displayed in step 822 through a user gesture such as a mouse right-click as the cursor is placed over its corresponding progress indicator segment. Once review of the detail information is complete, a determination is made in step 824 whether to interact with the selected computer operation detail information. If not, then observation of the interactive progress bars continues, beginning with step 808. Otherwise, a determination is made in step 826 whether to cancel the selected computer operation. If so, then the selected computer operation is canceled in step 828 and observation of the interactive progress bars continues, beginning with step 808. Otherwise, a determination is made in step 830 whether to pause the selected computer operation. If so, then the selected computer operation is paused in step 832 and observation of the interactive progress bars continues, beginning with step 808.

Otherwise, a determination is made in step 834 whether to modify the selected computer operation. If so, then the selected computer operation is modified in step 836. A determination is then made in step 838 whether the modified operation has related dependent or prerequisite operations. If it is determined in step 838 that the modified computer operation has dependent or prerequisite computer operations, then the order of the other computer operations are adjusted to accommodate the dependent and prerequisite operations in step 840. If not, then observation of the interactive progress bars continues, beginning with step 808.

However, if it is determined in step 834 not to modify the selected computer operation, then a determination is made in step 842 whether to reorder the selected computer operation. If so, then the order of the computer operation is changed in step 844. A determination is then made in step 846 whether the reordered operation has related dependent or prerequisite operations. If it is determined in step 846 that the modified computer operation has dependent or prerequisite computer operations, then the order of the other computer operations are adjusted to accommodate the dependent and prerequisite operations in step 840. If not, then observation of the interactive progress bars continues, beginning with step 808. A determination is then made in step 848 whether computer operations are to be restarted. If it is determined in step 848 to restart computer operations, then the progress bar slider is moved in step 850 to the progress indicator segment corresponding to the computer operation to be restarted. Computer operations are then restarted in step 852, beginning with the selected computer operation. Then, observation of the interactive progress bars continues, beginning with step 808. If it is determined in step 848 that computer operations are not to be restarted, then a determination is made in step 854 whether the selected computer operation is to be retargeted to another machine. As an example, the machine originally targeted for a computer operation may have insufficient resources, such as processors, memory, or storage to meet the requirements of the computer operation. Other machines may be available with sufficient resources. If so, then the computer operation can be retargeted to the available machine.

A determination is then made in step 856 whether the retargeting will be performed manually or automatically. If it is determined in step 856 that the retargeting will be performed manually, then manual retargeting operations are performed in step 858. In one embodiment, a secondary interactive progress indicator bar representing a computer operation to be retargeted is selected in a GUI through a user gesture, such as a mouse right-click, which opens an operation options menu. The user selects "retarget operation" from the operation options menu, which pauses the computer operation if it has already begun. A dialog window is opened, displaying target machines and related information, such as their available resources or current workload. The dialog window then prompts the user to select a target machine. The computer operation is then retargeted to the selected machine. In another embodiment, a secondary interactive progress indicator bar representing a computer operation to be retargeted is selected in a GUI through a user gesture, such as a mouse click-and-hold. The secondary interactive progress indicator bar is then dragged across the GUI and dropped on an icon representing the target machine. The operation then restarts on the target machine.

However, if it is determined in step 856 that the retargeting will be performed automatically, then automatic retargeting operations are performed in step 858. In one embodiment, assignment of similar computer operations, such as the implementation of Web application servers, is performed by a load balancer. As an example, a composite application comprises the implementation of three Web application servers, each of which can be installed in parallel on multiple physical servers. The load balancer automatically selects the target machine based on the resource requirements of the Web application servers. In another embodiment, the automatic retargeting of a computer operation is performed by a virtual machine manager (VMM), or hypervisor. For example, the aforementioned three Web application servers can be implemented in parallel on separate virtual machines running on the same physical server, or running on multiple servers in a cluster environment.

A determination is then made in step 562 whether the selected computer operation will be retargeted for one or more additional machines. As an example, a composite application may comprise an application element, such as the aforementioned Web application server, that requires at least one implementation, but multiple implementations are advantageous. However, there may also be a predetermined number of implementations that is considered optimal within the available resources. If it is determined in step 862 that the selected computer operation will be retargeted for additional machines, then the process is repeated, beginning with step 856. Otherwise, observation of the interactive progress bars continues, beginning with step 808. In different embodiments, the individual progress of each computer operation is displayed through their respective progress indicator bars as they are performed in parallel. In these and other embodiments, prerequisite and dependent operations may also need to be performed, modified, or reordered as a result of retargeting the computer operation. Many such embodiments are possible.

A decision is then made in step 864 whether to cease computer operations. If it is decided to cease computer operations, then they are ended in step 892. If it is decided to not cease computer operations, or if it is determined in step 819 to not view computer operation information, then the execution of the current element of the composite application is initiated in step 866. A secondary interactive progress indicator bar is then initiated in step 868 to indicate the progress of the current application element. A determination is then made in step 870 whether the current application element has a related prerequisite composite application element or computer operation. If it does, then the prerequisite composite application element or computer operation is executed in step 872. As the prerequisite composite application element or computer operation is being executed, a determination is made in step 874 whether the execution of the prerequisite composite application element or computer operation has been completed. If it has not, then the process continues, beginning with step 872. However, if it is determined in step 870 that the current application element does not have a prerequisite element or operation, or if it is determined in step 874 that the prerequisite element or operation has been completed, then the current composite application element is executed in step 876.

A determination is then made in step 878 whether the current composite application element is the last element to be executed. If so, then a determination is made in step 880 whether all computer operations of the composite application are complete. If they are not, then the execution of incomplete computer operations is monitored in step 882, with the process repeating, beginning with step 880. If it is determined in step 880 that all computer operations of the composite application are complete, then computer operations are ended in step 892. If it is determined in step 878 that the current composite application element is not the last element to be executed, then the composite application advances to the next element in step 884. A determination is then made in step 886 whether the next element requires the completion of one or more prior elements before it can be initiated for execution. If so, then a determination is made in step 888 whether the required elements have been completed. If the have not, then the execution of the previous one or more elements is monitored in step 890 and the process is repeated, beginning with step 888. However, if it is determined in step 886 that completion of prior elements are not required, or if it is determined in step 888 that the required prior elements have been completed, then the process continues, beginning with the observation of the interactive progress bar indicators in step 808.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:
1. A computer-implementable method for retargeting execution of at least one of a plurality of computer operations, comprising:
representing a plurality of computer operations with a graphical display, the graphical display comprising a graphical progress display;

segmenting the graphical display into a plurality of segments, each segment of the plurality of segments corresponding to a respective computer operation of the plurality of computer operations, each of the plurality of segments representing a progress segment;

retargeting at least one of the plurality of computer operations from a first computer system to a second computer system by actuating a segment of the plurality of segments;

associating respective graphical status elements to respective computer operations; and selecting a graphical status element to display information associated with status of a computer operation being associated; and wherein the retargeting further comprising reversing a computer operation that has been completed and restarting the computer operation, the reversing and restarting being in response to actuating the segment of the plurality of segments corresponding to the respective computer operation.

2. The method of claim 1, wherein the retargeting further comprises at least one of:

canceling a computer operation that is in progress;
pausing a computer operation that is in progress;
modifying a computer operation;
reordering a sequence of execution of the plurality of computer operations.

3. The method of claim 1, wherein the retargeting of the computer operation from a first computer system to a second computer system is performed manually.

4. The method of claim 1, wherein the retargeting of the computer operation from a first computer system to a second computer system is performed automatically.

5. A system comprising:

a processor;
a data bus coupled to the processor; and
a computer-usable medium embodying computer program code, the computer-usable medium being coupled to the data bus, the computer program code managing the execution of a plurality of computer operations within a graphical user interface and comprising instructions executable by the processor and configured for:
representing a plurality of computer operations with a graphical display, the graphical display comprising a graphical progress display;
segmenting the graphical display into a plurality of segments, each segment of the plurality of segments corresponding to a respective computer operation of the plurality of computer operations, each of the plurality of segments representing a progress segment;
retargeting at least one of the plurality of computer operations from a first computer system to a second computer system by actuating a segment of the plurality of segments;
associating respective graphical status elements to respective computer operations; and
selecting a graphical status element to display information associated with status of a computer operation being associated; and wherein
the retargeting further comprising reversing a computer operation that has been completed and restarting the computer operation, the reversing and restarting being in response to actuating the segment of the plurality of segments corresponding to the respective computer operation.

6. The system of claim 5, wherein the instructions for retargeting further comprise instructions for:

canceling a computer operation that is in progress;
pausing a computer operation that is in progress;
modifying a computer operation; and,
reordering a sequence of execution of the plurality of computer operations.

7. The system of claim 5, wherein:

the retargeting of the computer operation from a first computer system to a second computer system is performed manually.

8. The system of claim 5, wherein:

the retargeting of the computer operation from a first computer system to a second computer system is performed automatically.

9. A non-transitory computer-usable medium embodying computer program code, the computer program code comprising computer executable instructions configured for:

representing a plurality of computer operations with a graphical display, the graphical display comprising a graphical progress display;
segmenting the graphical display into a plurality of segments, each segment of the plurality of segments corresponding to a respective computer operation of the plurality of computer operations, each of the plurality of segments representing a progress segment;
retargeting at least one of the plurality of computer operations from a first computer system to a second computer system by actuating a segment of the plurality of segments;
associating respective graphical status elements to respective computer operations; and
selecting a graphical status element to display information associated with status of a computer operation being associated; and wherein
the retargeting further comprising reversing a computer operation that has been completed and restarting the computer operation, the reversing and restarting being in response to actuating the segment of the plurality of segments corresponding to the respective computer operation.

10. The computer usable medium of claim 9, wherein the instructions for retargeting further comprise instructions for:

canceling a computer operation that is in progress;
pausing a computer operation that is in progress;
modifying a computer operation; and,
reordering a sequence of execution of the plurality of computer operations.

11. The computer usable medium of claim 9, wherein:

the retargeting of the computer operation from a first computer system to a second computer system is performed manually.

12. The computer usable medium of claim 9, wherein:

the retargeting of the computer operation from a first computer system to a second computer system is performed automatically.

13. The computer usable medium of claim 9, wherein the computer executable instructions are deployable to a client computer from a server at a remote location.

14. The computer usable medium of claim 9, wherein the computer executable instructions are provided by a service provider to a customer on an on-demand basis.

* * * * *